US010862332B2

(12) United States Patent
Jin et al.

(10) Patent No.: US 10,862,332 B2
(45) Date of Patent: Dec. 8, 2020

(54) GRID-CONNECTED POWER CONVERTER CONTROL

(71) Applicant: Rockwell Automation Technologies, Inc., Mayfield Heights, OH (US)

(72) Inventors: Lei Jin, Shanghai (CN); Haihui Lu, Shanghai (CN); Karthik Palaniappan, Pewaukee, WI (US); Ahmed S. Mohamed Sayed Ahmed, Mequon, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 78 days.

(21) Appl. No.: 16/357,653

(22) Filed: Mar. 19, 2019

(65) Prior Publication Data

US 2020/0303943 A1 Sep. 24, 2020

(51) Int. Cl.
*H02J 5/00* (2016.01)
*H02J 7/34* (2006.01)
*G05F 1/10* (2006.01)
*H02J 3/38* (2006.01)
*H02J 3/28* (2006.01)

(52) U.S. Cl.
CPC .............. *H02J 7/34* (2013.01); *G05F 1/10* (2013.01); *H02J 3/28* (2013.01); *H02J 3/381* (2013.01)

(58) Field of Classification Search
CPC ...... H02J 7/34; H02J 3/28; H02J 3/381; H02J 5/00; G05F 1/10
See application file for complete search history.

(56) References Cited

U.S. PATENT DOCUMENTS

| | | | |
|---|---|---|---|
| 6,459,599 B1 | 10/2002 | Agirman et al. | |
| 9,124,140 B2 * | 9/2015 | Li | H02P 9/105 |
| 9,270,286 B2 | 2/2016 | Ahmed et al. | |
| 2014/0362617 A1 * | 12/2014 | Li | H02J 3/00 |
| | | | 363/34 |
| 2015/0092462 A1 * | 4/2015 | Ohori | H02M 1/42 |
| | | | 363/71 |
| 2015/0188401 A1 * | 7/2015 | Zheng | H02M 7/44 |
| | | | 363/95 |

(Continued)

OTHER PUBLICATIONS

B.H. Kwon et al., "A Line-Voltage-Sensorless Synchronous Rectifier", IEEE Transactions on Power Electronics, vol. 14, No. 5, Sep. 1999, pp. 966-972.

(Continued)

*Primary Examiner* — Ryan Jager
(74) *Attorney, Agent, or Firm* — Kunzler Bean & Adamson

(57) ABSTRACT

For grid-connected power converter control, a method estimates a d-axis grid voltage from a d-axis reference current modified with a d-axis current, and a q-axis current modified with a filter inductive reactance. The method generates a q-axis grid voltage from a direct current (DC) voltage input modified with the DC bus voltage modified with a notch filter to balance the voltage input and further reduced with the q-axis current. The method modifies the estimated d-axis grid voltage and the q-axis grid voltage by selectively removing second-order harmonics. The method further determines a d-axis voltage output and a q-axis voltage output as a function of the modified estimated d-axis grid voltage and the modified q-axis grid voltage.

20 Claims, 14 Drawing Sheets

(56) References Cited

U.S. PATENT DOCUMENTS

2016/0329714 A1* 11/2016 Li ............................ H02J 3/381
2019/0123559 A1* 4/2019 Dong ........................ H02J 3/28

OTHER PUBLICATIONS

I. Agirman et al., "A Novel Control Method of a VSC Without AC Line Voltage Sensors", IEEE Transactions on Industry Applications, vol. 39, No. 2, Mar./Apr. 2003, pp. 519-524.

Y. Suh et al., "A Comparative Study on Control Algorithm for Active Front-End Rectifier of Large Motor Drives Under Unbalanced Input", IEEE Transactions on Industry Applications, vol. 47, No. 3, May/Jun. 2011, pp. 1419-1431.

V. Miskovic et al., "Robust Sensorless Control of Grid Connected Converters with LCL Line Filters Using Frequency Adaptive Observers as AC Voltage Estimators", 2016 IEEE Applied Power Electronics Conference and Exposition (APEC), Mar. 20-24, 2016, pp. 2167-2174.

H. Yoo et al., "Sensorless Operation of a PWM Rectifier for a Distributed Generation", IEEE Transactions on Power Electronics, vol. 22, No. 3, May 2007, pp. 1014-1018.

M. Malinowski et al., "Simple Direct Power Control of Three-Phase PWM Rectifier Using Space-Vector Modulation (DPC-SVM)", IEEE Transactions on Industrial Electronics, vol. 51, No. 2, Apr. 2004, pp. 447-454.

J. Kukkola et al., "State Observer for Grid-Voltage Sensorless Control of a Converter Under Unbalanced conditions", IEEE Transactions on Industry Applications, vol. 54, No. 1, Jan./Feb. 2018, pp. 286-297.

J.A. Suul et al., "Voltage-Sensor-Less Synchronization to Unbalanced Grids by Frequency-Adaptive Virtual Flux Estimation", IEEE Transactions on Industrial Electronics, vol. 59, No. 7, Jul. 2012, pp. 2910-2923.

* cited by examiner

US 10,862,332 B2

GRID-CONNECTED POWER CONVERTER CONTROL

BACKGROUND INFORMATION

The subject matter disclosed herein relates to power converter control.

BRIEF DESCRIPTION

A method for grid-connected power converter control is disclosed. The method estimates, by use of a controller, a d-axis grid voltage from a d-axis reference current modified with a d-axis current, and a q-axis current modified with a filter inductive reactance. The method generates a q-axis grid voltage from a direct current (DC) voltage input modified with the DC bus voltage modified with a notch filter to balance the voltage input and further reduced with the q-axis current. The method modifies the estimated d-axis grid voltage and the q-axis grid voltage by selectively removing second-order harmonics. The method further determines a d-axis voltage output and a q-axis voltage output as a function of the modified estimated d-axis grid voltage and the modified q-axis grid voltage.

An apparatus for grid-connected power converter control is also disclosed. The apparatus includes a plurality of controller semiconductor gates. The controller semiconductor gates estimate a d-axis grid voltage from a d-axis reference current modified with a d-axis current, and a q-axis current modified with a filter inductive reactance. The controller semiconductor gates further generate a q-axis grid voltage from a DC voltage input modified with the DC bus voltage modified with a notch filter to balance the voltage input and further reduced with the q-axis current. The controller semiconductor gates modify the estimated d-axis grid voltage and the q-axis grid voltage by selectively removing second-order harmonics. The controller semiconductor gates determine a d-axis voltage output and a q-axis voltage output as a function of the modified estimated d-axis grid voltage and the modified q-axis grid voltage.

A system for grid-connected power converter control is also disclosed. The system includes a controller, a direct quadrature (DQ) to three-phase (ABC), a pulse width modulator (PWM), a power converter, and a filter. The controller estimates a d-axis grid voltage from a d-axis reference current modified with a d-axis current, and a q-axis current modified with a filter inductive reactance. The controller further generates a q-axis grid voltage from a DC voltage input modified with the DC bus voltage modified with a notch filter to balance the voltage input and further reduced with the q-axis current. The controller determines a d-axis voltage output and a q-axis voltage output as a function of the modified estimated d-axis grid voltage and the modified q-axis grid voltage. The DQ to ABC reference frame transform drives the PWM as a function of the d-axis voltage output and q-axis voltage output. The PWM generates gate control signals based on the d-axis voltage output and the q-axis voltage output. The power converter outputs electrical power as driven by the PWM. The filter filters the electrical power between the power converter and a grid power.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
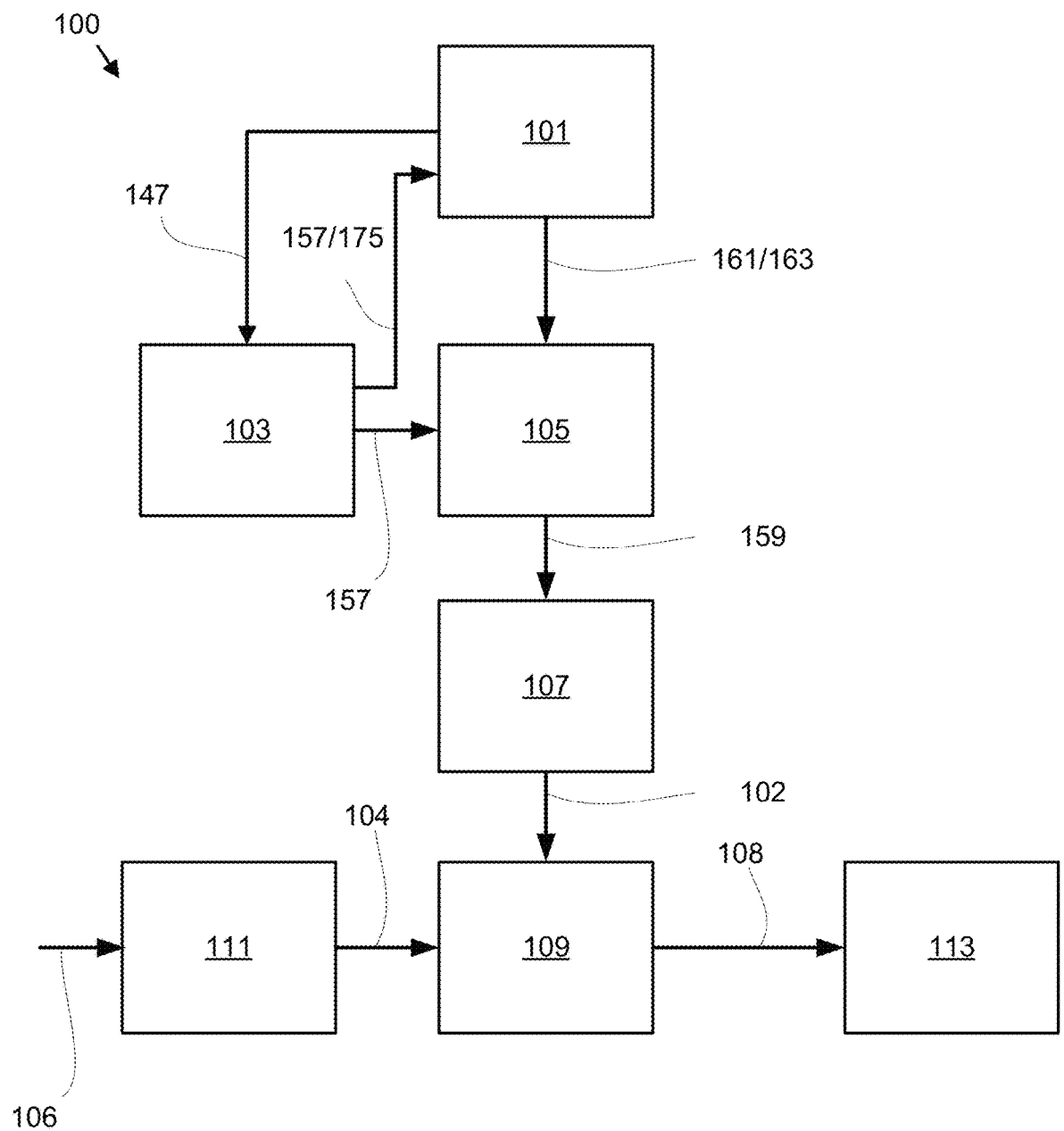
FIG. 1A is a schematic block diagram of a grid-connected power converter system according to an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing.

In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Python, Java, JavaScript, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program product may be shared, simultaneously serving multiple customers in a flexible, automated fashion.

The computer program product may be integrated into a client, server and network environment by providing for the computer program product to coexist with applications, operating systems and network operating systems software and then installing the computer program product on the clients and servers in the environment where the computer program product will function. In one embodiment software is identified on the clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure may refer to elements of proceeding figures. Like numbers refer to like elements in all figures, including alternate embodiments of like elements.

FIG. 1A is a schematic block diagram of a grid-connected power converter system 100. The system 100 may receive Alternating Current (AC) grid power 106 and supply filtered Direct Current (DC) electrical power 108 over a power bus 113. The grid power 106 may include fluctuations, transient changes, harmonics, and the like. The system 100 removes the fluctuations, transient changes, and harmonics so that the power bus 113 provides clean power to one or more devices.

In the depicted embodiment, the system 100 includes a controller 101, a PLL 103, a DQ to ABC reference frame transform 105, a PWM 107, a power converter 109, a filter 111, and the power bus 113. The DQ to ABC reference frame transform 105 may be embodied in the controller 101. In addition, the system 100 may not include a grid voltage sensor. The absence of the grid voltage sensor increases the reliability of the system 100 as the system 100 will not fail when a grid voltage sensor fails. Grid sensors are also susceptible to noise, including environmental noise and line noise, particularly under weak-grid conditions. In addition, the absence of the grid voltage sensor reduces maintenance costs as the grid voltage sensor need not be regularly replaced and/or tested. As a result, the reliability of the system 100 is greatly enhanced while the cost of maintaining the system 100 is reduced.

In one embodiment, the controller 101 estimates a direct (d)-axis grid voltage $-E_d$ 147. The estimated direct d-axis grid voltage $-E_d$ 147 may be used by the PLL 103 to generate a grid-voltage phase angle $\theta_e$ 157 and a grid frequency $\omega_e$ 175 without the grid voltage sensor. The estimation of the d-axis grid voltage $-E_d$ 147 is described hereafter. The estimated d-axis grid voltage $-E_d$ 147 is further employed to generate a d-axis voltage output 161 and a quadrature (q)-axis voltage output 163 which drive the DQ to ABC reference frame transform 105 to generate a three-phase voltage command $V_{abc}$ 159 that controls the pulse width modulator 107. The pulse width modulator 107 generates gate control signals 102 that switch transistors in the power converter 109 to convert the grid power 106 into the DC electric power 108. The power converter 109 receives filtered grid power 106 as converter side current 104. In one embodiment, the system 100 is an active front end (AFE) converter.

Figure 1B:
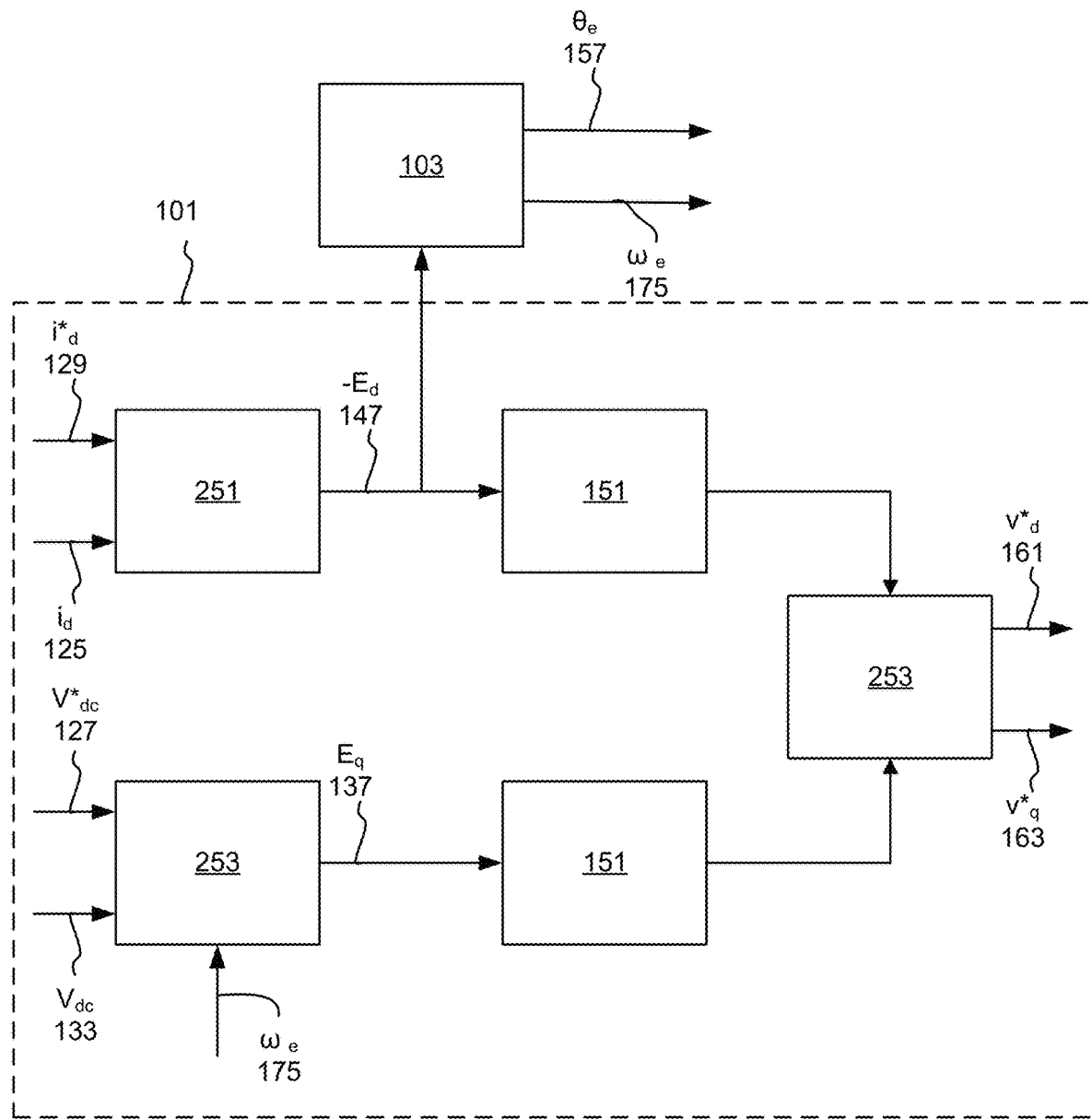
FIG. 1B is a schematic block diagram of a controller and phase lock loop (PLL) according to an embodiment.

FIG. 1B is a schematic block diagram of the controller 101 and the PLL 103. In the depicted embodiment, the controller 101 includes a voltage estimator 251, a voltage generator 253, two or more resonant regulators 151, and a DQ voltage generator 253. The voltage estimator 251 estimates the estimated d-axis grid voltage $-E_d$ 147 as a function of at least a d-axis reference current i*$_d$ 129 modified with a d-axis current i$_d$ 125. In addition, the voltage estimator 251 may estimate a q-axis current as will be described hereafter in FIG. 2A. The voltage generator 253 generates a q-axis grid voltage $E_q$ 137 as a function of at least a DC voltage input V*dc 127 modified with the DC bus voltage 133. In addition, the q-axis grid voltage $E_q$ 137 may be modified with the grid frequency $\omega_e$ 175.

The PLL 103 receives the estimated d-axis grid voltage $-E_d$ 147 and determines the grid-voltage phase angle $\theta_e$ 157 and the grid frequency $\omega_e$ 175. The determination of the grid-voltage phase angle $\theta_e$ 157 and the grid frequency $\omega_e$ 175 is described in more detail in FIG. 2B.

The second-order resonant regulators 151 may selectively remove grid negative-sequence harmonic currents. In one embodiment, the second order resonant regulators 151 each implement the transfer function of Equation 1, where s is a frequency transform, $\omega_e$ is the grid frequency 175 obtained from the PLL 103, and $k_{r2}$ is a nonzero constant.

$$R_2(s) = \frac{k_{r2} \cdot s}{s^2 + (2\omega_e)^2},$$ Equation 1

The output of each second-order resonant regulator 151 is received by the DQ voltage generator 253. The DQ voltage generator 253 determines the d-axis voltage output 161 and the q-axis voltage output 163.

Figure 2A:
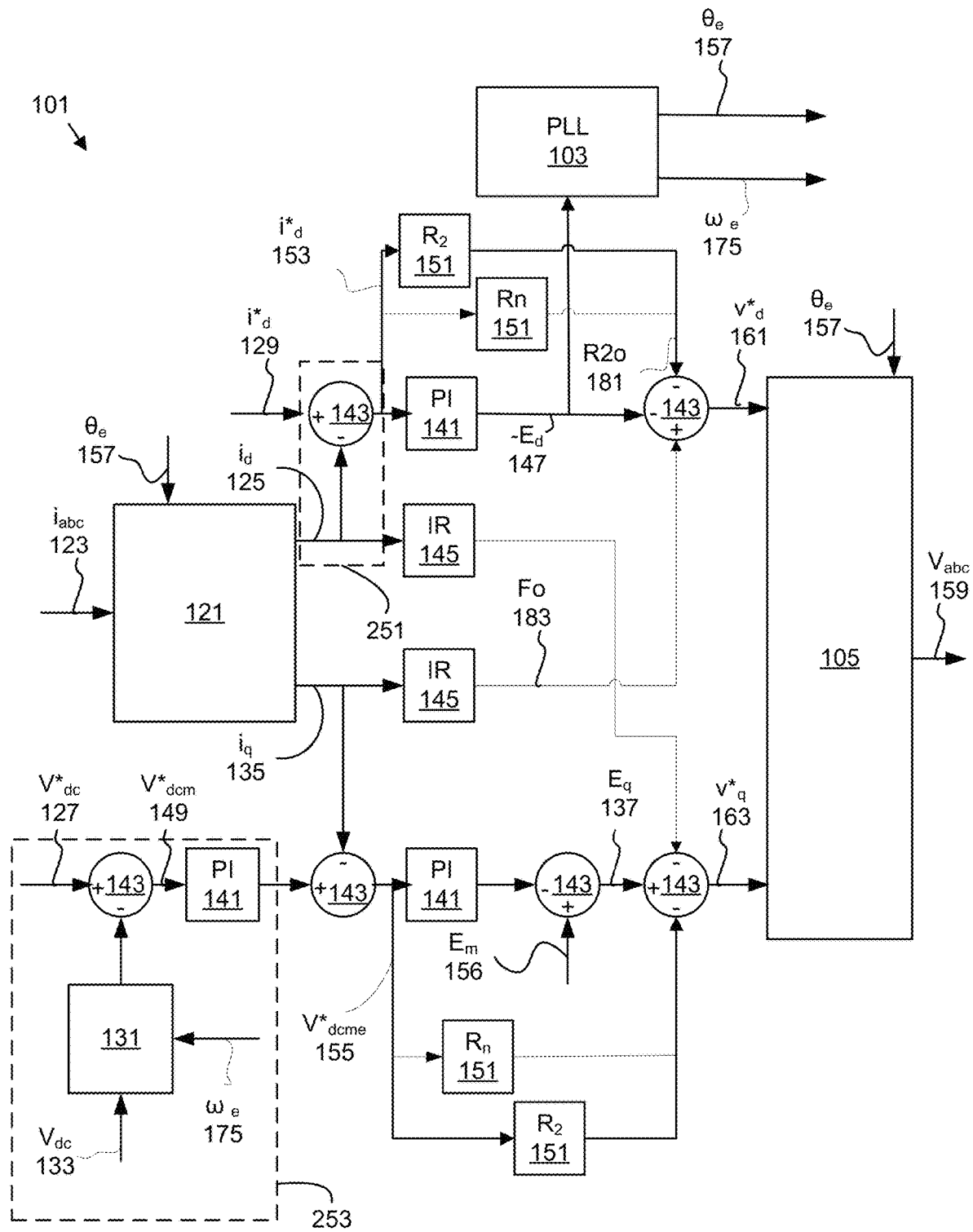
FIG. 2A is a schematic block diagram of a controller and PLL according to an embodiment.

FIG. 2A is a schematic block diagram of the controller 101 and the PLL 103. One embodiment of estimating the d-axis grid voltage $-E_d$ 147 and determining the d-axis voltage output $v^*_d$ 161 and the q-axis voltage output $v^*_q$ 163 is depicted. The controller 101 and the PLL 103 may comprise a plurality of semiconductor gates and/or electrical components. In one embodiment, the controller 101 and/or PLL 103 are implemented with the processor.

The d-axis current $i_d$ 125 is an ABC to DQ reference frame transform 121 of the grid-voltage phase angle $\theta_e$ 157 generated by the PLL 103 and a three-phase current $i_{abc}$ 123 of the converter side current 104 of the power converter 109. In addition, the q-axis current $i_q$ 135 is the ABC to DQ reference frame transform 121 of the grid-voltage phase angle $\theta_e$ 157 generated by the PLL 103 and the three-phase current 123. In one embodiment, $i_d$ 125 and $i_q$ 135 are determined using Equation 2, where $i_a$, $i_b$, $i_c$ are the three phase currents of the power converter 109.

$$\begin{bmatrix} i_d \\ i_q \end{bmatrix} = \frac{2}{3} \begin{bmatrix} \cos(\theta_e) & \cos\left(\theta_e - \frac{2\pi}{3}\right) & \cos\left(\theta_e + \frac{2\pi}{3}\right) \\ -\sin(\theta_e) & -\sin\left(\theta_e - \frac{2\pi}{3}\right) & -\sin\left(\theta_e + \frac{2\pi}{3}\right) \end{bmatrix} \begin{bmatrix} i_a \\ i_b \\ i_c \end{bmatrix}$$ Equation 2

In the depicted embodiment, a DC bus voltage 133 of the DC electric power 108 is modified with a notch filter 131 and subtracted from the voltage input 127 to balance the voltage input 127 as the modified voltage input $V^*_{dcm}$ 149. The modified voltage input $V^*_{dcm}$ 149 may be further modified by a proportional-integral (PI) controller 141. The q-axis current $i_q$ 135 is subtracted from the modified voltage input 149 to generate the modified voltage input estimate $V^*_{dcme}$ 155. The modified voltage input estimate $V^*_{dcme}$ 155 may be filtered by a PI controller 141. The modified voltage input estimate $V^*_{dcme}$ 155 is subtracted from a rated machine voltage magnitude $E_m$ 156 to generate the q-axis grid voltage $E_q$ 137. In one embodiment, the rated machine voltage magnitude 156 is 311V for a 380V three-phase AC grid.

In one embodiment, the modified voltage input estimate $V^*_{dcme}$ 155 transformed by a second-order resonant regulator 151 is subtracted from the q-axis grid voltage $E_q$ 137 to determine the q-axis voltage output 163. In addition, the modified voltage input estimate $V^*_{dcme}$ 155 transformed by an n-order resonant regulator 151 also may be subtracted from the q-axis grid voltage $E_q$ 137 to determine the q-axis voltage output 163. In one embodiment, n-order resonant regulators Rn 151 are in parallel with the second-order resonant regulators $R_2$ 151 on both d-axis and q-axis. The n-order resonant regulators 151 each implement the transfer function shown in Equation 3, wherein s is a frequency transform, $\omega_e$ is the grid frequency 175 obtained from the PLL 103, $k_m$ is a nonzero constant, and $\Delta\theta$ is a phase angle for delay compensation.

$$R_n(s) = \frac{k_m \cdot [s \cdot \cos(\Delta\theta) - n\omega_e \cdot \sin(\Delta\theta)]}{s^2 + (n\omega_e)^2}$$ Equation 3

In a certain embodiment, the d-axis current $i_d$ 125 modified by a filter inductive reactance 145 is also subtracted from the q-axis grid voltage $E_q$ 137 to determine the q-axis voltage output 163. The filter inductive reactance 145 may implement the function of Equation 4, where L is an inductance of the filter 111.

$$F(s) = \omega_e L$$ Equation 4

In one embodiment, the d-axis current $i_d$ 125 is subtracted from the d-axis reference current $i^*_d$ 129 to generate the modified d-axis current input $i^*_d$ 153. The modified d-axis current input $i^*_d$ 153 may be modified by a PI filter 141 to estimate the d-axis grid voltage $-E_d$ 147.

In one embodiment, the d-axis grid voltage $-E_d$ 147 is subtracted from the q-axis current iq 135 to generate the d-axis voltage output 161. The q-axis current iq 135 may be modified by a filter inductive reactance 145 implementing the function of Equation 4 to generate a function output Fo 183.

In a certain embodiment, the d-axis reference current $i^*_d$ 129 is transformed by the second-order resonant regulator 151 implementing Equation 1. The regulated output 181 from the second-order resonant regulator 151 also may be subtracted from the function output Fo 183. In addition, the modified d-axis current input $i^*_d$ 153 may be transformed by the n-order resonant regulator 151 implementing Equation 3 to generate the regulated output 181.

A DQ to ABC reference frame transform 105 may determine a three-phase voltage command $V_{abc}$ 159 for the pulse width modulator 107 from the d-axis voltage output 161 and the q-axis voltage output 163. The DQ to ABC reference frame transform 105 may implement Equation 5, wherein $V_a$, $v_b$, and $v_c$ are phase voltage components of the three-phase voltage command $V_{abc}$ 159.

$$\begin{bmatrix} v_a \\ v_b \\ v_c \end{bmatrix} = \begin{bmatrix} \cos(\theta_e) & -\sin(\theta_e) \\ \cos\left(\theta_e - \frac{2\pi}{3}\right) & -\sin\left(\theta_e - \frac{2\pi}{3}\right) \\ \cos\left(\theta_e + \frac{2\pi}{3}\right) & -\sin\left(\theta_e + \frac{2\pi}{3}\right) \end{bmatrix} \begin{bmatrix} v^*_d \\ v^*_q \end{bmatrix}$$ Equation 5

In one embodiment, the PLL 103 receives the estimated d-axis grid voltage $-E_d$ 147. The determination of the grid-voltage phase angle $\theta_e$ 157 and the grid frequency $\omega_e$ 175 are described in more detail in FIG. 2B.

Figure 2B:
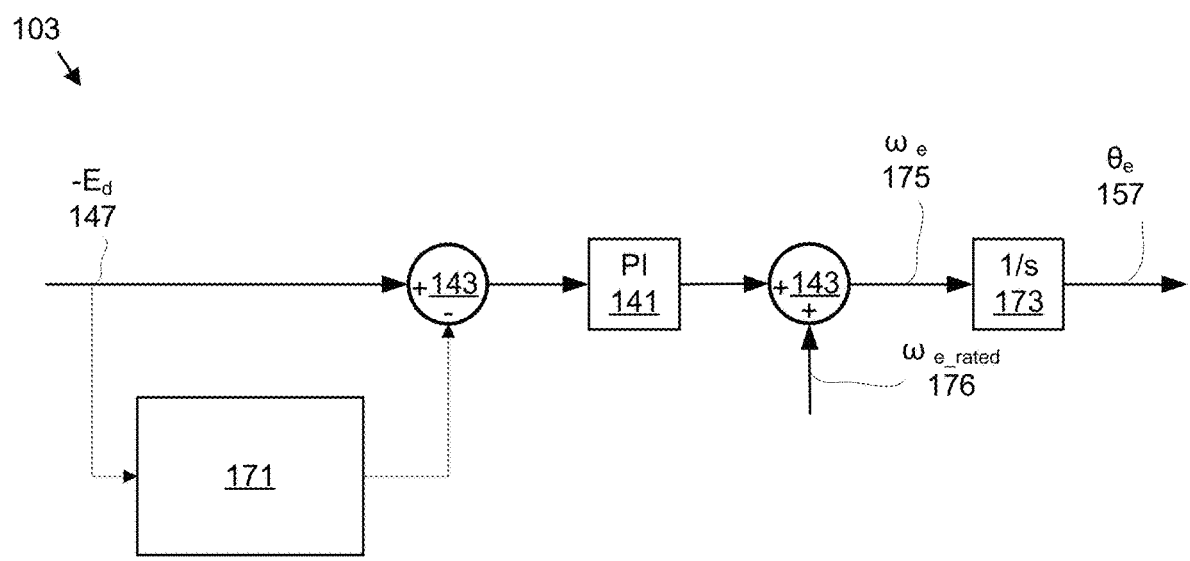
FIG. 2B is a schematic block diagram of a PLL according to an embodiment.

FIG. 2B is a schematic block diagram of the PLL 103. In the depicted embodiment, the estimated d-axis grid voltage $-E_d$ 147 is received and filtered with a tracking filter 171.

The tracking filter 171 may track specified harmonics from the estimated d-axis grid voltage $-E_d$ 147. The tracking filter 171 may implement the tracking function $T_n(s)$ of Equation 6, where n is an order of the tracking filter 171 and $k_n s$ is a nonzero constant.

$$T_n(s) = \frac{k_n s}{s^2 + k_n s + (n\omega_e)^2} \qquad \text{Equation 6}$$

The tracking filter 171 may utilize the grid frequency $\omega_e$ 175 determined by the PLL 103 to implement a tracking function $T_n(s)$ at frequency $n \times \omega_e$ where n is an integer. The output of the tracking filter 171 is subtracted from the estimated d-axis grid voltage $-E_d$ 147, with the result filtered with a PI controller 141 and summed with a rated grid frequency 176 $\omega_{e\_rated}$ to generate the grid frequency $\omega_e$ 175. The grid frequency $\omega_e$ 175 may be integrated by an integrator 173 to generate the grid-voltage phase angle $\theta_e$ 157. As a result, both the grid-voltage phase angle $\theta_e$ 157 and the grid frequency $\omega_e$ 175 are generated from the estimated d-axis grid voltage $-E_d$ 147 without the use of a grid voltage sensor.

Figure 3:
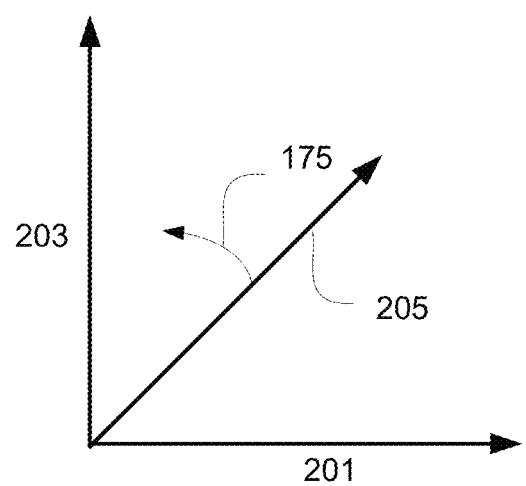
FIG. 3 is a drawing of a direct and quadrature axes according to an embodiment.

FIG. 3 is a drawing of direct (d) and quadrature (q) axes. The d-axis 201 and the q-axis 203 are shown. The d-axis 201 and the q-axis 203 may be used to represent a three-phase vector 205. The three-phase vector 205 may be expressed as a vector in the d-axis 201 and a vector in the q-axis 203 that rotates at the grid frequency $\omega_e$ 175.

Figure 4:
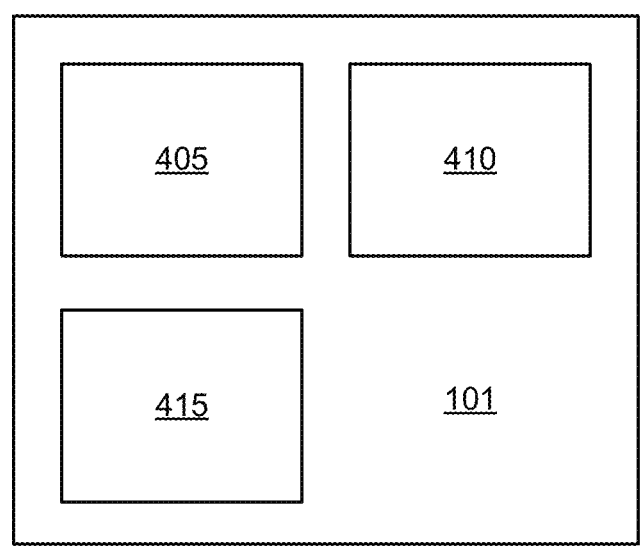
FIG. 4 is a schematic block diagram of a controller according to an embodiment.

FIG. 4 is a schematic block diagram of a controller 101. The controller 101 may comprise a plurality of semiconductor gates. In the depicted embodiment, the controller 101 includes a processor 405, a memory 410, and communication hardware 415. The memory 410 may include a semiconductor storage device, hard disk drive, a micromechanical storage device, or combinations thereof. The memory 410 may store code. The processor 405 may execute the code. The communication hardware 415 may communicate with other components and/or devices. For example, the communication hardware 415 may communicate with the DQ to ABC reference frame transform 105 and/or pulse width modulator 107.

Figure 5:
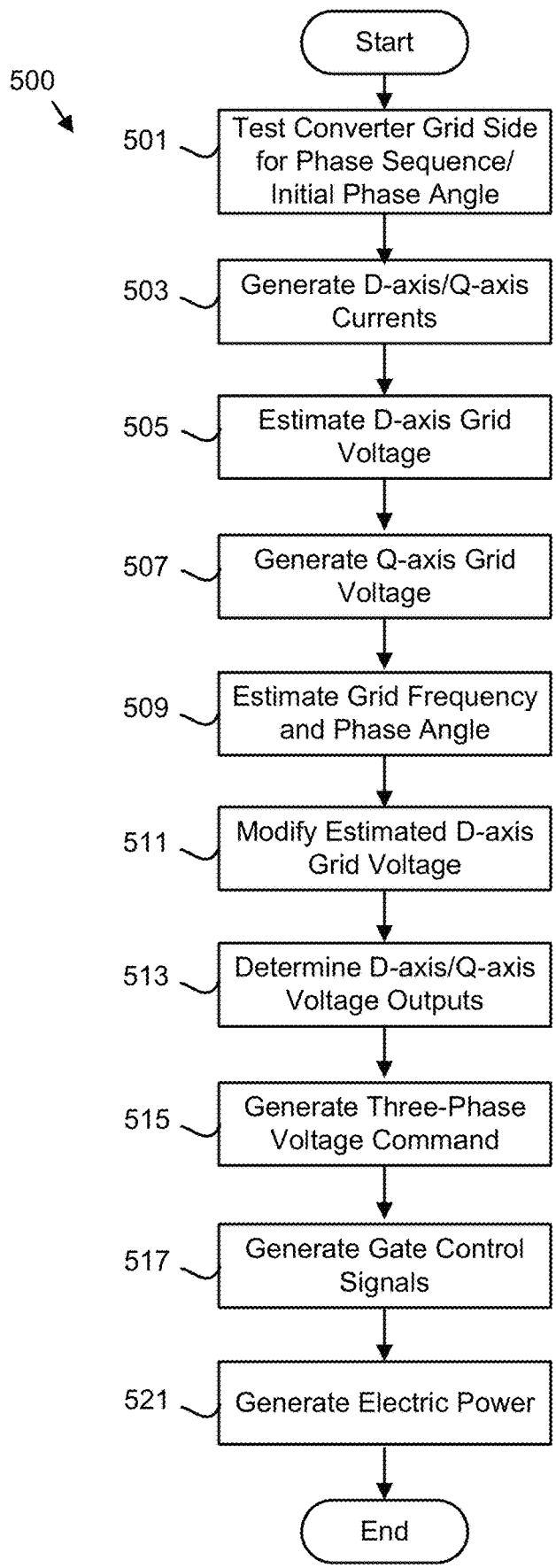
FIG. 5 is a flow chart diagram of a power converter control method according to an embodiment.

FIG. 5 is a flow chart diagram of a power converter control method 500. The method 500 may estimate the d-axis grid voltage $-E_d$ 147 in order to generate gate control signals 102 and generate electric power 108. The method 500 may be performed by the controller 101 and/or the system 100.

The method 500 starts, and in one embodiment, the controller 101 tests 501 the converter grid side for an initial phase sequence and an initial phase angle 157 of the grid power voltages. In one embodiment, the initial phase sequence and the initial phase angle 157 are measured by current sensors at the power converter 109. The initial phase sequence may be stored.

The controller 101 further generates 503 the d-axis current $i_d$ 125 and the q-axis current $i_q$ 135. The d-axis current $i_d$ 125 and the q-axis current $i_q$ 135 may be generated 503 from the three-phase current $i_{abc}$ 123 of the grid power 106 as shown in FIG. 2A.

The controller 101 estimates 505 the d-axis grid voltage $-E_d$ 147 from the d-axis reference current $i^*_d$ 129 modified with the d-axis current $i_d$ 125, and estimates the q-axis current $i_q$ 135 modified with a filter inductive reactance 145. The d-axis current $i_d$ 125 and the q-axis current $i_q$ 135 may be generated 503 using Equation 2.

In addition, the controller 101 may generate 507 the q-axis grid voltage $E_q$ 137. The q-axis grid voltage $E_q$ 137 may be generated 507 from the DC voltage input V*dc 127 modified with the DC bus voltage 133. The DC bus voltage 133 may modified with a notch filter 131 to balance the voltage input 127. In addition, the q-axis grid voltage $E_q$ 137 may be reduced with a q-axis current $i_q$ 135.

The controller 101 and/or PLL 103 may estimate 509 the grid-voltage phase angle $\theta_e$ 157 and a grid frequency $\omega_e$ 175 as described in FIG. 2B. In addition, the controller 101 may modify 511 the estimated d-axis grid voltage $-E_d$ 147 by selectively removing second-order harmonics. In one embodiment, the controller 101 selectively modifies the q-axis grid voltage $E_q$ 137 by selectively removing second-order harmonics. The second-order harmonics may be removed by second-order resonant regulators 151. The second-order resonant regulators 151 may implement the transfer function of Equation 1. In addition, n-order resonant regulators 151 may remove additional harmonics from the estimated d-axis grid voltage $-E_d$ 147 and/or q-axis grid voltage $E_q$ 137, where n is an integer number in the range of 3 to 30.

The controller 101 may further determine 513 the d-axis voltage output 161 and the q-axis voltage output 163 as a function of the modified estimated d-axis grid voltage $-E_d$ 147 and the modified q-axis grid voltage $E_q$ 137. The d-axis voltage output 161 and the q-axis voltage output 163 may be determined 513 as shown in FIG. 2A.

The controller 101 may generate 515 the three-phase voltage command $V_{abc}$ 159 for the pulse width modulator 107. The three-phase voltage command $V_{abc}$ 159 from the d-axis voltage output 161 and the q-axis voltage output 163 using Equation 5.

In response to the three-phase voltage command $V_{abc}$ 159, the pulse width modulator 107 may generate 517 the gate control signals 102. In response to the gate control signals 102 the power converter 109 may convert the grid power 106 and/or converter side power 104 into the DC electric power 108 to supply the power bus 113, and the method 500 ends.

Figure 6A:
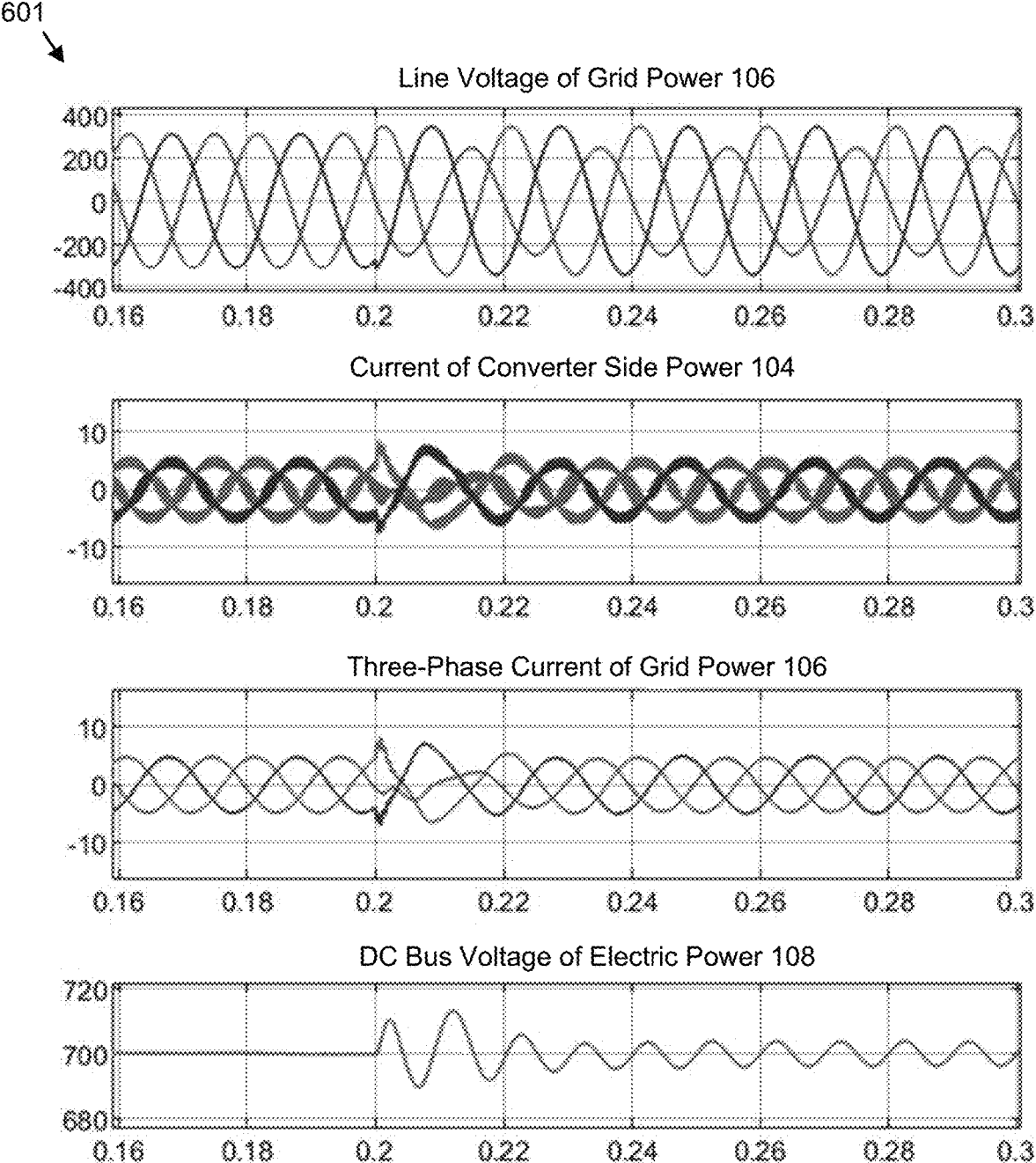
FIG. 6A shows graphs of system input and output under grid unbalance according to an embodiment.

FIG. 6A shows graphs 601 of system input and output under grid unbalance. The line voltage of the grid power 106 in volts, the current of the converter side power 104 in amps, the three-phase current of grid power 106 in amps, and the DC bus voltage of the electric power 108 in volts are shown for a system 100 using two second-order resonant regulators 151.

Figure 6B:
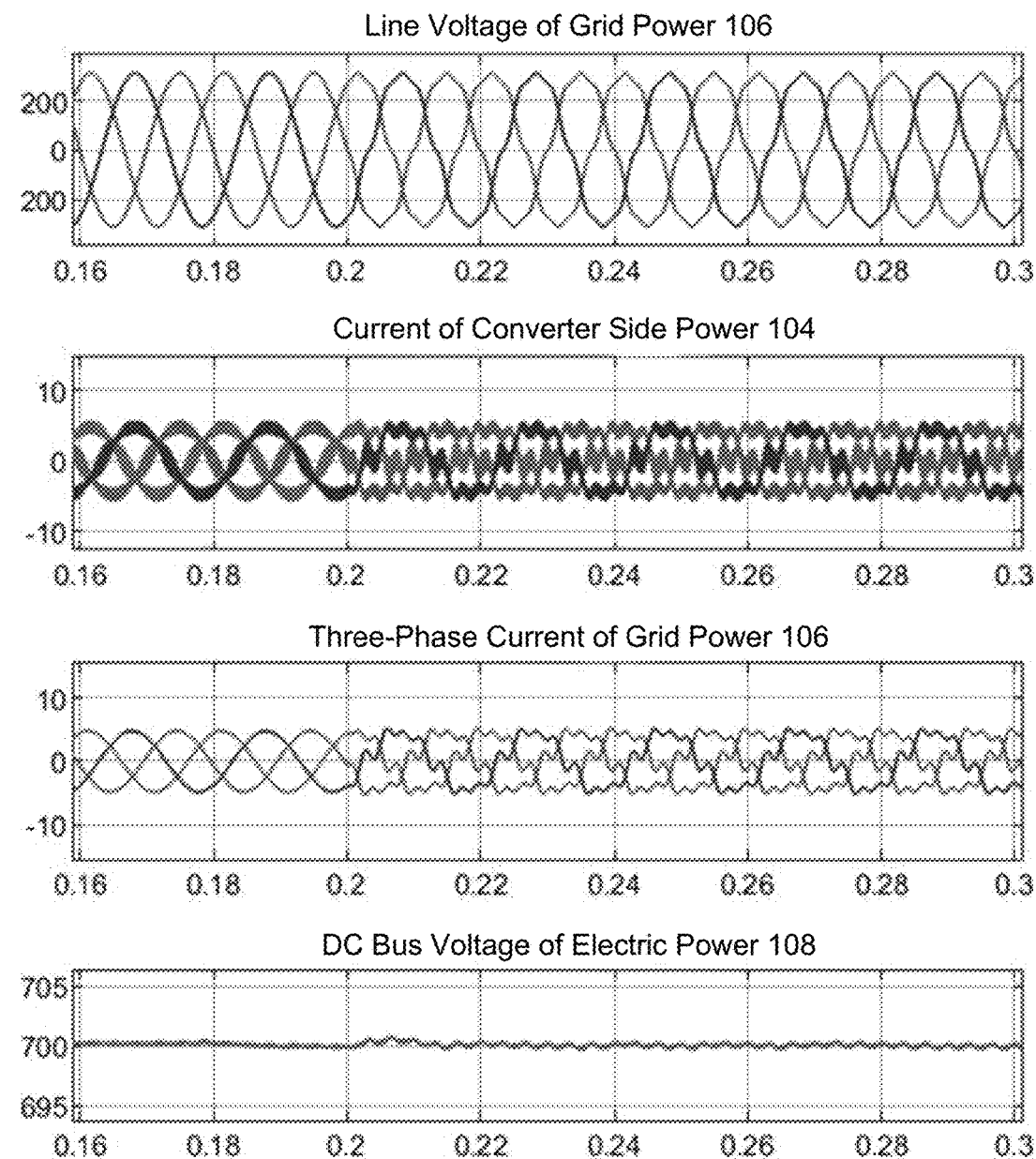
FIG. 6B shows graphs of system input and output under grid harmonics according to an embodiment.

FIG. 6B shows graphs 603 of system input and output under grid harmonics using two second-order resonant regulators 151 in the controller 101 and a six-order tracking filter 171 in the PLL 103. The line voltage of the grid power 106, the current of the converter side power 104, the three-phase current of grid power 106, and the DC bus voltage of the electric power 108 are shown for a system 100 receiving grid power 106 with $-5^{th}$ and $+7^{th}$ order harmonics of 5 percent each.

Figure 6C:
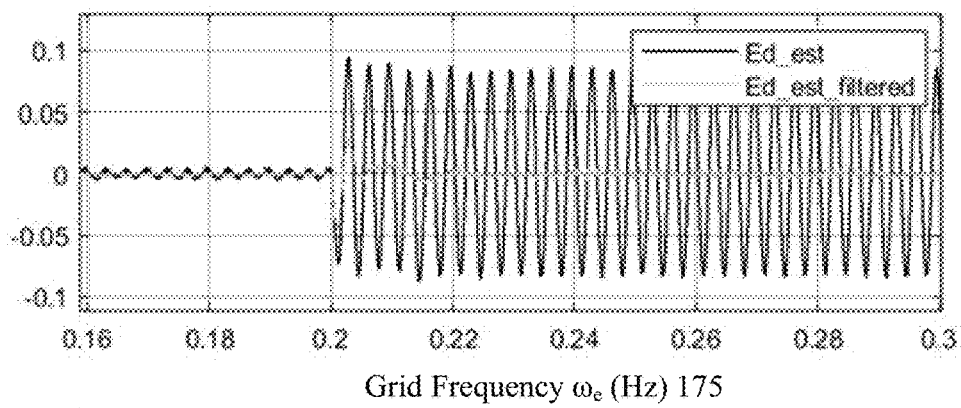
FIG. 6C shows graphs of controller internal signals under grid harmonics according to an embodiment.
Figure 6C:
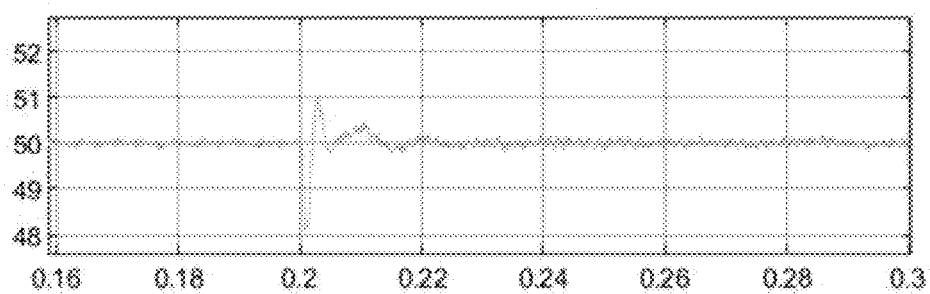
Figure 6C:
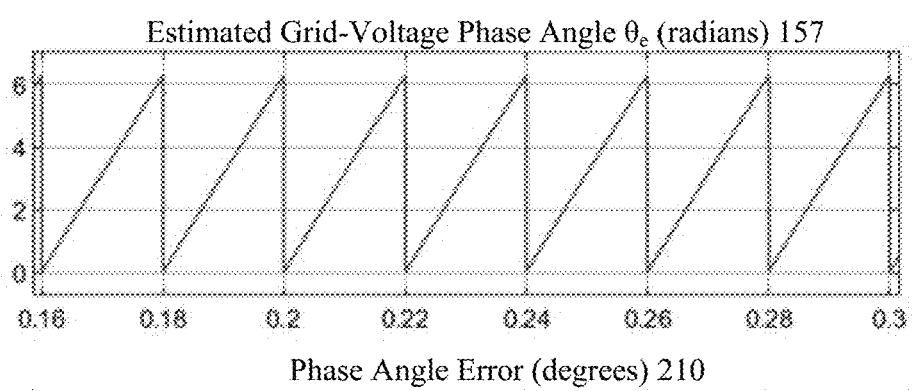
Figure 6C:
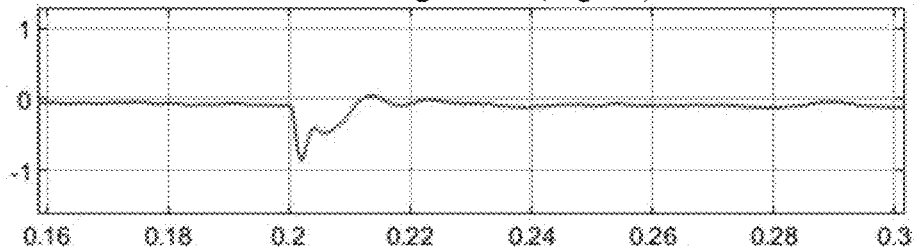

FIG. 6C shows graphs 605 of controller internal signals under grid harmonics for the graphs 603 of FIG. 6B. The d-axis grid voltage $-E_d$ 147 in per units, estimated grid frequency $\omega_e$ 175 in $\omega_e/2\pi$ Hz, the estimated grid-voltage phase angle $\theta_e$ 157 in radians, and a phase angle error 210 in degrees for the estimated grid-voltage phase angle $\theta_e$ 157 minus an actual voltage phase angle are shown.

Figure 6D:
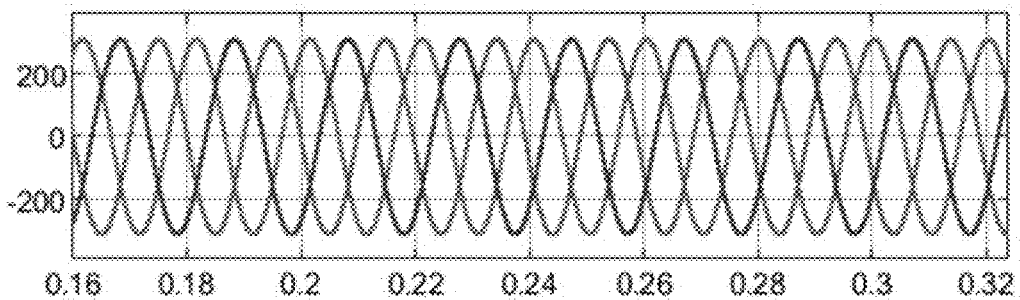
FIG. 6D shows graphs of system input and output for a 1 Hertz (Hz) step change in line frequency according to an embodiment.
Figure 6D:
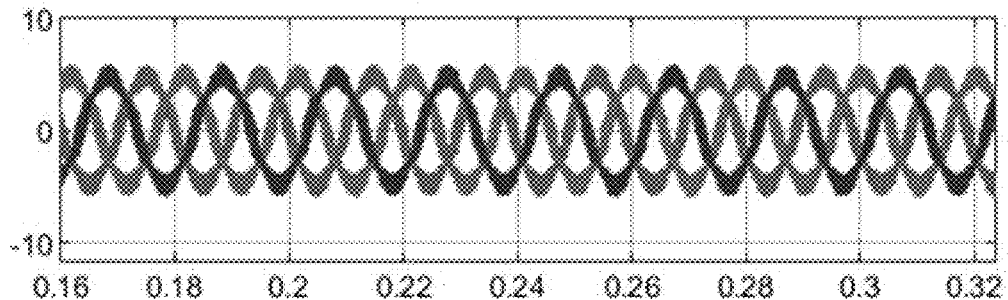
Figure 6D:
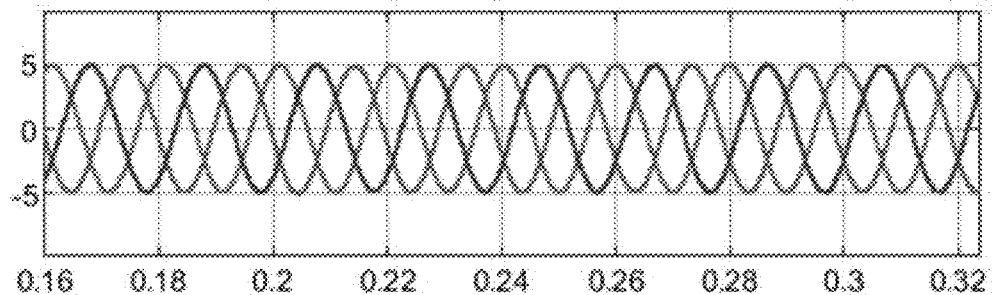
Figure 6D:
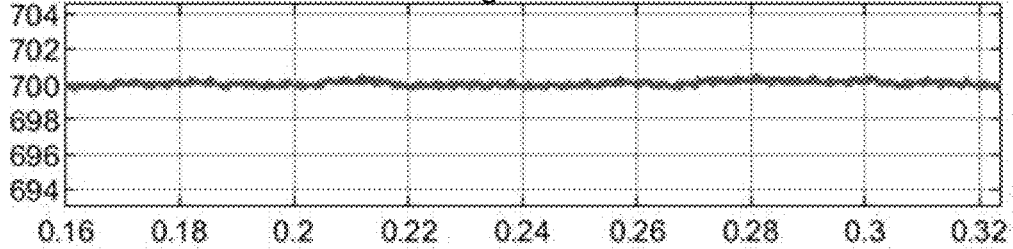

FIG. 6D shows graphs 607 of system input and output. The line voltage of the grid power 106, the current of the converter side power 104, the three-phase current of grid power 106, and the DC bus voltage of the electric power 108 are shown for a system 100 receiving grid power 106 for a 1 Hz step change in line frequency at time t=0.2 seconds (s) and t=0.26 s.

Figure 6E:
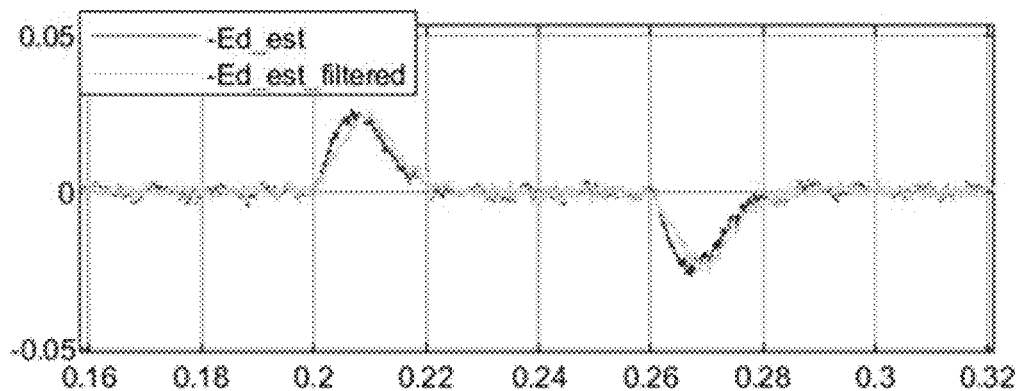
FIG. 6E shows graphs of controller internal signals for a 1 Hz step change in line frequency according to an embodiment.
Figure 6E:
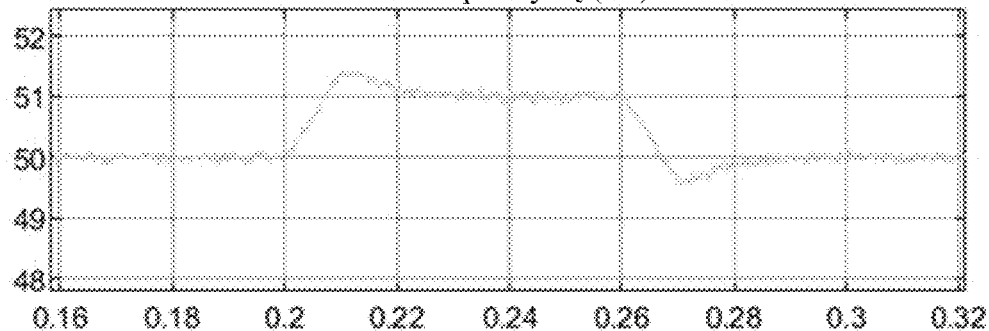
Figure 6E:
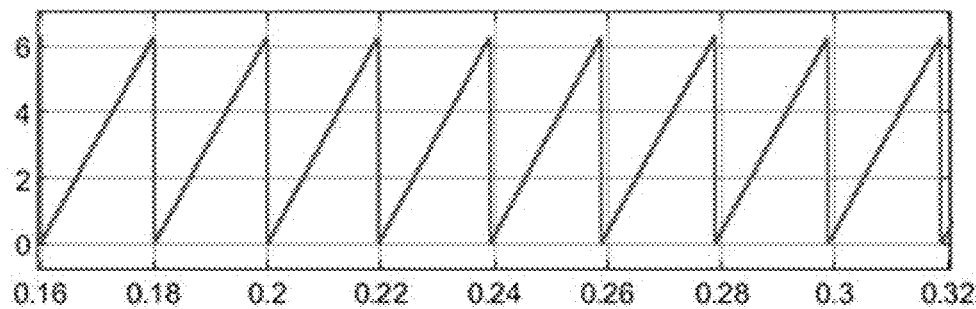
Figure 6E:
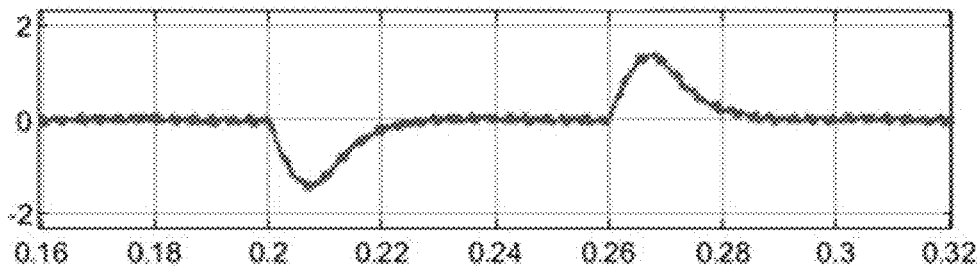

FIG. 6E shows graphs 609 of controller internal signals for the graphs 607 of FIG. 6D. The estimated d-axis grid voltage $-E_d$ 147, filtered estimated d-axis grid voltage $-E_d$ in per units, estimated grid frequency $\omega_e$ 175 in $\omega_e/2\pi$ Hz, the estimated grid-voltage phase angle $\theta_e$ 157 in radians, and a phase angle error 210 in degrees are shown.

Figure 6F:
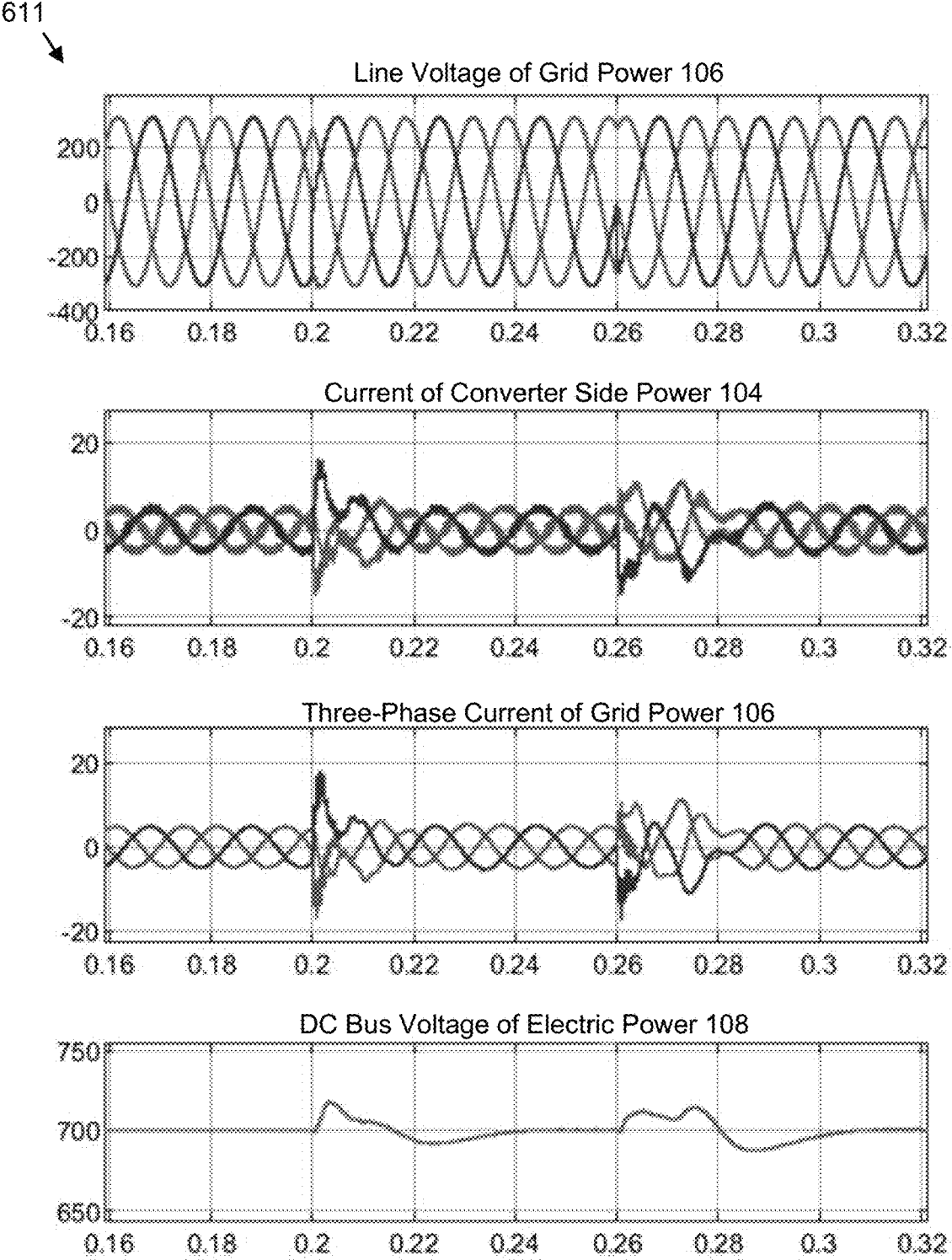
FIG. 6F shows graphs of system input and output for a phase angle step change in line voltage according to an embodiment.

FIG. 6F shows graphs 611 of system input and output. The line voltage of the grid power 106, the current of the converter side power 104, the three-phase current of grid power 106, and the DC bus voltage of the electric power 108 are shown for a system 100 receiving grid power 106 with a phase angle 60 degree step change in line voltage at t=0.2 s and t=0.26 s.

Figure 6G:
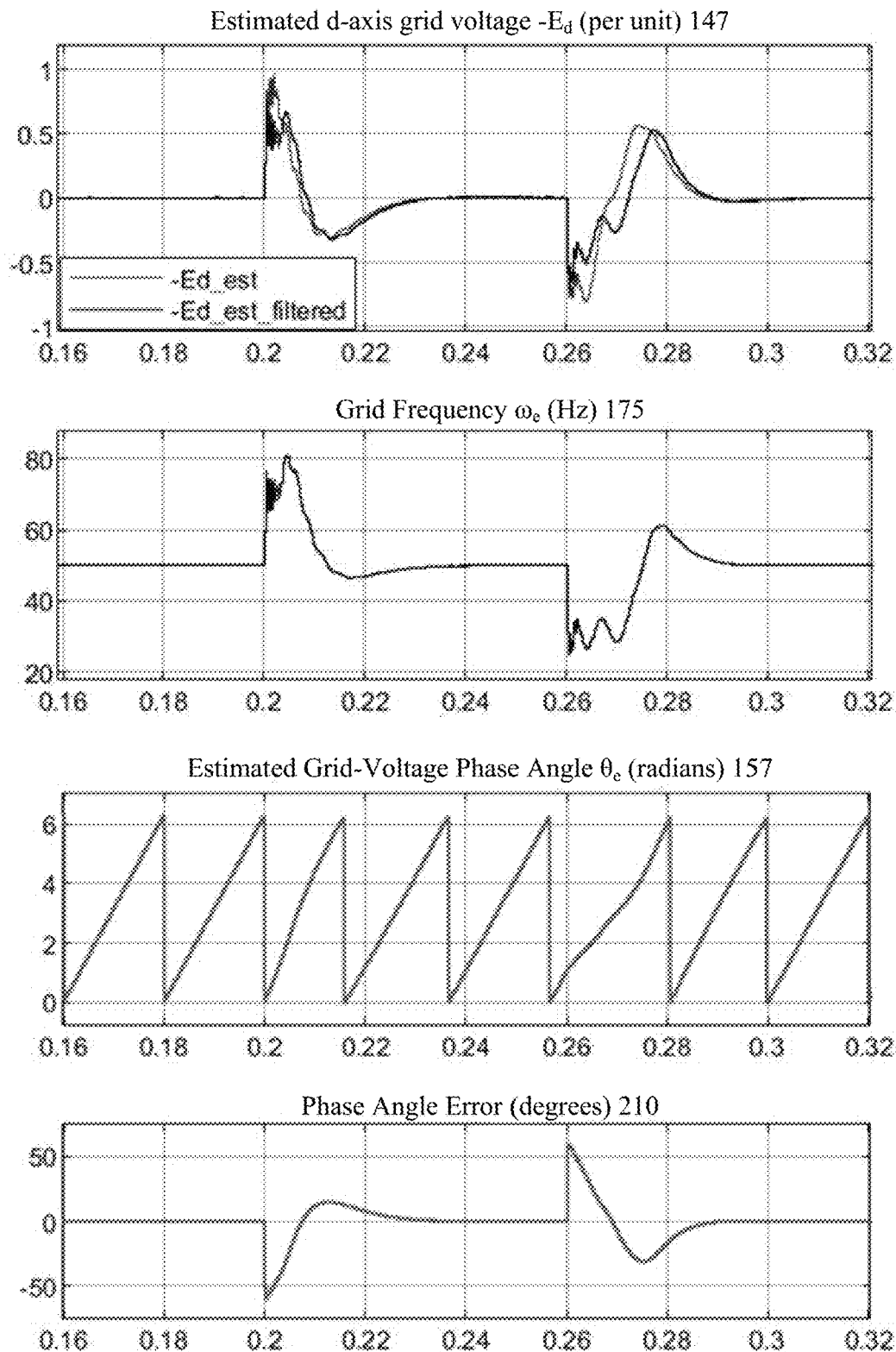
FIG. 6G shows graphs of controller internal signals for a phase angle step change in line voltage according to an embodiment.

FIG. 6G shows graphs 613 of controller internal signals for the graphs 611 of FIG. 6F. The d-axis grid voltage $-E_d$ 147 in per units, estimated grid frequency $\omega_e$ 175 in $\omega_e/2\pi$ Hz, the estimated grid-voltage phase angle $\theta_e$ 157 in radians, and the phase angle error 210 in degrees are shown.

Problem/Solution

The grid-connected power converter system 100 converts the grid power 106 into the filtered electrical power 108. Efficiently converting the grid power 106 requires the voltage of the grid power 106. Unfortunately, sensing the voltage of the grid power 106 would require a sensor that is prone to environmental noise, resulting in reduced system performance or prone to failure.

The embodiments described herein estimate the d-axis grid voltage 147 and generate the q-axis grid voltage 137 without a voltage sensor for the grid power 106. As a result, the system 100 efficiently converts the grid power 106 without the voltage sensor for the grid power 106. The downtime of the system 100 is reduced as there are no voltage sensor failures or maintenance for the voltage sensor. Thus the efficiency and the functioning of the system 100 are enhanced.

This description uses examples to disclose the invention and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
    estimating, by use of a controller, a d-axis grid voltage from a d-axis reference current modified with a d-axis current, and a q-axis current modified with a filter inductive reactance;
    generating a q-axis grid voltage from a direct current (DC) voltage input modified with the DC bus voltage modified with a notch filter to balance the voltage input and further reduced with the q-axis current;
    modifying the estimated d-axis grid voltage and the q-axis grid voltage by selectively removing second-order harmonics; and
    determining a d-axis voltage output and a q-axis voltage output as a function of the modified estimated d-axis grid voltage and the modified q-axis grid voltage.

2. The method of claim 1, wherein the grid negative-sequence harmonic currents are selectively removed with two second order resonant regulators.

3. The method of claim 2, wherein the two second order resonant regulators 151 each implement a transfer function $$R_2(s) = \frac{k_{r2} \cdot s}{s^2 + (2\omega_e)^2},$$

wherein s is a frequency transform, $\omega_e$ is a grid frequency obtained from a phase lock loop, and $k_{r2}$ is a nonzero constant.

4. The method of claim 3, wherein n-order resonant regulators are in parallel with $R_2$ 151 on both d-axis and q-axis, the higher order resonant regulators each implement a transfer function $$R_n(s) = \frac{k_{rn} \cdot [s \cdot \cos(\Delta\theta) - n\omega_e \cdot \sin(\Delta\theta)]}{s^2 + (n\omega_e)^2},$$

wherein s is a frequency transform, $\omega_e$ is a grid frequency obtained from a PLL, $k_{rn}$ is a nonzero constant, and $\Delta\theta$ is a phase angle for delay compensation.

5. The method of claim 1, wherein the d-axis current and the q-axis current are an ABC to DQ reference frame transform 121 of a grid-voltage phase angle generated by a phase lock loop (PLL) and a three-phase current.

6. The method of claim 5, wherein the PLL further comprises a tracking filter that tracks specified harmonics from the estimated d-axis grid voltage.

7. The method of claim 6, wherein the tracking filter utilizes the grid frequency determined by the PLL to implement a tracking function at frequency $n \times \omega_e$ where n is an integer.

8. The method of claim 1, wherein one or more of the modified voltage input, the modified d-axis current input, and the reduced, modified voltage input is further modified by at least one proportional-integral controller.

9. The method of claim 1, wherein no grid voltage sensor is used.

10. The method of claim 1, wherein the estimated d-axis grid voltage is selected from the group consisting of an output of a d-axis proportional-integral regulator and the d-axis voltage output plus a regulated output minus a function output.

11. An apparatus comprising:
    a plurality of semiconductor gates that:
    estimate a d-axis grid voltage from a d-axis reference current modified with a d-axis current, and a q-axis current modified with a filter inductive reactance;
    generate a q-axis grid voltage from a direct current (DC) voltage input modified with the DC bus voltage modified with a notch filter to balance the voltage input and further reduced with the q-axis current;
    modify the estimated d-axis grid voltage and the q-axis grid voltage by selectively removing second-order harmonics; and
    determine a d-axis voltage output and a q-axis voltage output as a function of the modified estimated d-axis grid voltage and the modified q-axis grid voltage.

12. The apparatus of claim 11, wherein the grid negative-sequence harmonic currents are selectively removed with two second order resonant regulators.

13. The apparatus of claim 12, wherein the two second order resonant regulators each implement a transfer function $$R_2(s) = \frac{k_{r2} \cdot s}{s^2 + (2\omega_e)^2},$$

wherein s is a frequency transform, $\omega_e$ is a grid frequency obtained from a phase lock loop (PLL), and $k_{r2}$ is a nonzero constant.

14. The apparatus of claim 11, wherein the d-axis current and the q-axis current are an ABC to DQ reference frame transform of a grid-voltage phase angle generated by a PLL and a three-phase current.

15. The apparatus of claim 14, wherein the PLL further comprises a tracking filter that tracks specified harmonics from the estimated d-axis grid voltage.

16. The apparatus of claim 15, wherein the tracking filter utilizes the grid frequency determined by the PLL to implement a tracking function at frequency $n \times \omega_e$ where n is an integer.

17. The apparatus of claim 11, wherein one or more of the modified voltage input, the modified d-axis current input, and the reduced, modified voltage input is further modified by at least one proportional-integral controller.

18. The apparatus of claim 11, wherein no grid voltage sensor is used.

19. The apparatus of claim 11, wherein the estimated d-axis grid voltage is selected from the group consisting of an output of a d-axis proportional-integral regulator and the d-axis voltage output plus a regulated output minus a function output.

20. A system comprising:
a controller that:
estimates a d-axis grid voltage from a d-axis reference current modified with a d-axis current, and a q-axis current modified with a filter inductive reactance;
generates a q-axis grid voltage from a direct current (DC) voltage input modified with the DC bus voltage modified with a notch filter to balance the voltage input and further reduced with the q-axis current;
modifies the estimated d-axis grid voltage and the q-axis grid voltage by selectively removing second-order harmonics;
determines a d-axis voltage output and a q-axis voltage output as a function of the modified estimated d-axis grid voltage and the modified q-axis grid voltage;
a DQ to ABC reference frame transform that drives a pulse width modulator (PWM) as a function of the d-axis voltage output and the q-axis voltage output;
the PWM generates gate control signals based on the d-axis voltage output and the q-axis voltage output;
a power converter that outputs electrical power as driven by the PWM; and
a filter that filters the electrical power between the power converter and a grid power.

* * * * *